A. C. E. RATEAU.
REGULATOR FOR FLUID PRESSURE APPARATUS.
APPLICATION FILED JAN. 19, 1907. RENEWED JAN. 20, 1910.
1,080,582.
Patented Dec. 9, 1913.
2 SHEETS—SHEET 1.
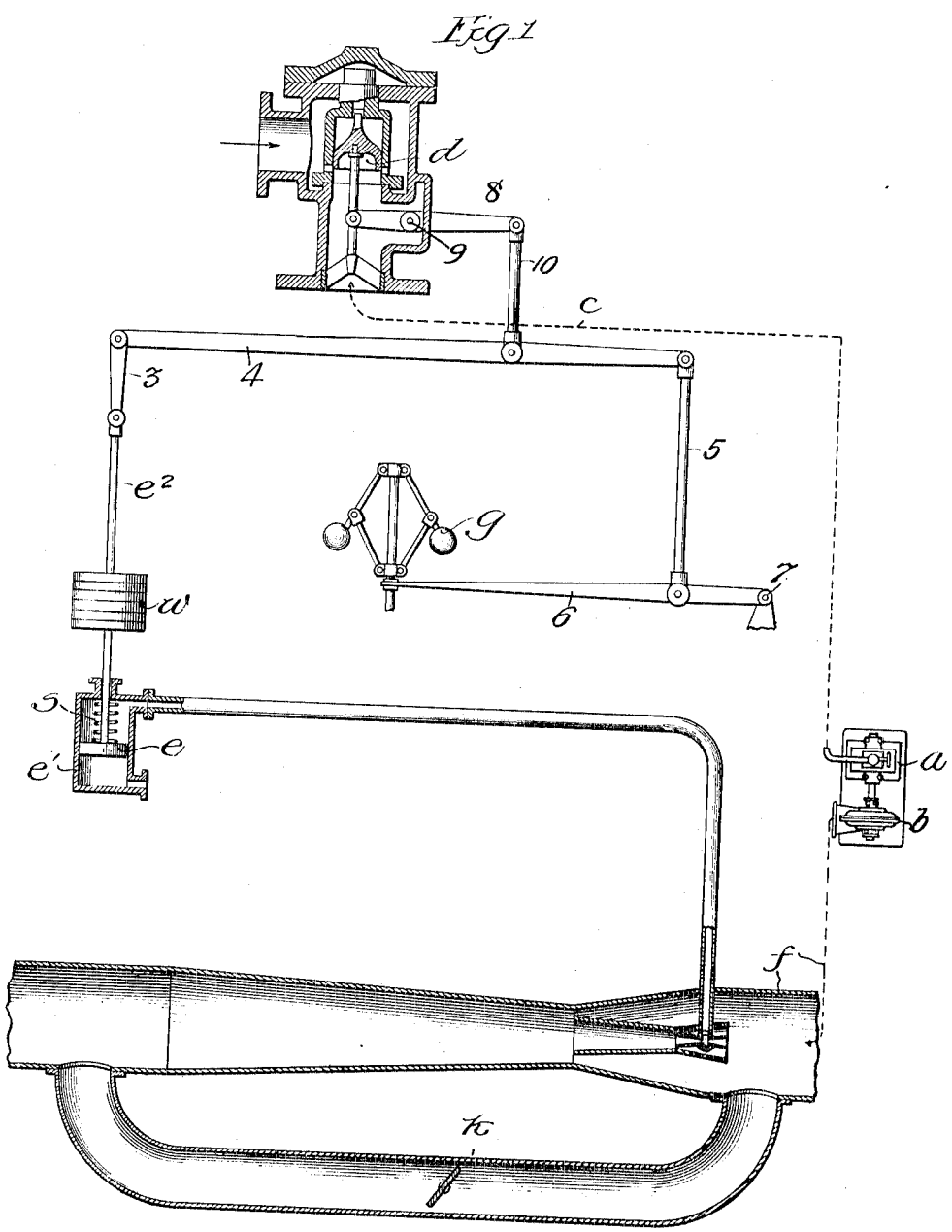

A. C. E. RATEAU.
REGULATOR FOR FLUID PRESSURE APPARATUS.
APPLICATION FILED JAN. 19, 1907. RENEWED JAN. 20, 1910.
1,080,582.
Patented Dec. 9, 1913.
2 SHEETS—SHEET 2.
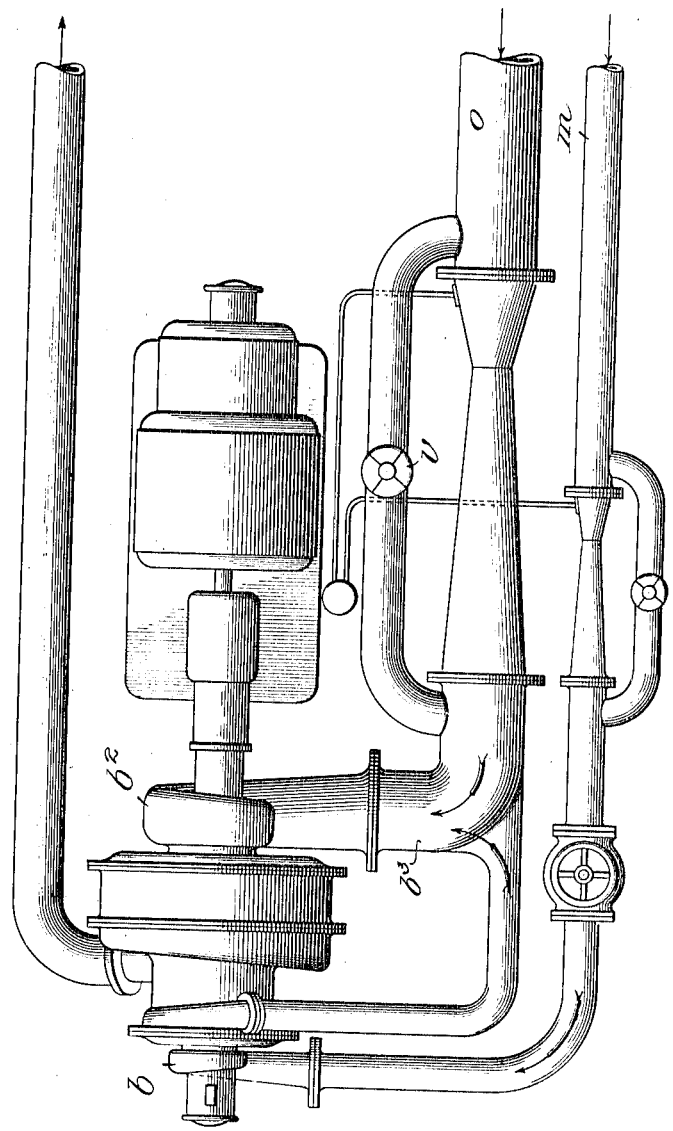

UNITED STATES PATENT OFFICE.

AUGUSTE CAMILLE EDMOND RATEAU, OF PARIS, FRANCE.

REGULATOR FOR FLUID-PRESSURE APPARATUS.

1,080,582.  Specification of Letters Patent.  Patented Dec. 9, 1913.

Application filed January 19, 1907, Serial No. 353,040. Renewed January 20, 1910. Serial No. 539,138.

*To all whom it may concern:*

Be it known that I, AUGUSTE CAMILLE EDMOND RATEAU, citizen of the Republic of France, residing at Paris, France, have invented a certain new and useful Improvement in Regulators for Fluid-Pressure Apparatus, of which the following is a full, clear, concise, and exact description.

This invention relates to the regulation of motors driving fluid-impelling apparatus, such as centrifugal compressors, and has for its object to make available, as a basis for regulation, variations in the fluid discharge, by creating thereby variations in pressure of sufficient strength to operate easily the piston or other moving part of the controlling mechanism which governs the speed of the motor furnishing the power.

My invention also looks toward the provision of means for maintaining constant the proportions of different fluids in a mixture discharged by impelling apparatus which receives such fluids separately.

In accordance with my invention I provide a multiplier of pressure-difference arranged to be acted upon by the fluid current driven by the impeller, and subject the controlling part, such as a piston or diaphragm of the motor-regulator, to such multiplied pressure-difference. The multiplier preferably consists of a series of converging-diverging tubes disposed in the fluid current driven by the impeller, these tubes being arranged concentrically one inside the other, the discharge mouth of each inner tube being located at the constricted portion or neck of the tube next outside, one face of the piston (or equivalent part) of the regulator being put in communication with the neck of the innermost tube. In a converging-diverging tube conveying a fluid current, the static pressure at the constricted portion is much less than at the discharge mouth of said tubes, and by arranging several such tubes as indicated the pressure-difference is greatly multiplied.

My invention also contemplates the provision of a by-pass around the multiplier with a valve controlling said by-pass, whereby the regulation may be made more perfect. I also preferably combine the pressure regulator with a centrifugal governor upon the motor, so as to regulate said motor upon the basis both of its speed and of the strength of the fluid current.

My invention will be described more particularly by reference to the accompanying drawings, in which—

Figure 1 is a diagram illustrating the regulator as applied to a turbine-driven air compressor; Fig. 2 illustrates an application of the invention to two compressors arranged to receive two different gases and discharge a mixture thereof, the regulating mechanism serving to determine and maintain constant the proportions of the respective gases in the mixture.

The same letters of reference indicate the same parts wherever they are shown.

Referring first to Fig. 1, the turbine engine $a$ driving the centrifugal air-compressor $b$ receives its steam through a pipe $c$ (indicated by a dotted line) the supply of steam being controlled by the valve $d$ of the regulating mechanism. This valve is arranged to be opened and closed by a system of levers operated both by the usual centrifugal governor $g$ of the turbine and by the piston $e$ which is controlled by the fluid-pressure. The piston $e$ works in the cylinder $e^1$, and in this case is subjected on one side to the atmospheric pressure, and on the other to a pressure derived through the "multiplier" of pressure-difference, acted upon by the fluid current of the compressor, and which is variable therewith. The "multiplier" in this case is composed of a series of convergent-divergent tubes arranged concentrically in the pipe $f$ traversed by the fluid current, the discharge mouth of each tube being located at the constricted portion or neck of the tube next outside. In a convergent-divergent tube conveying a fluid current, the fluid finding a smaller section of passage takes on a greater velocity, and in the constricted portion of the tube there is a lowering of pressure proportional to the square of the velocity and so to the square of the rate of flow. To arrive at great differences in pressure with a single such tube, the passage would be so constricted as to reduce the flow too greatly, and I therefore multiply the pressure-difference by arranging several such tubes as above described and then connect the constricted portion or neck of the innermost passage with the cylinder $e^1$ upon that side of the piston, or controlling part, which is intended to receive the variable pressure. The difference in pressure between the entrance and the neck of the convergent-divergent tube is much greater than that which exists between the entrance and the exit. If between the entrance and the neck a similar tube is disposed, the drop in pressure at the neck of this second tube will also be greater than in the preceding tube. By arranging three, or even four tubes in this manner, as great a drop in pressure as desired may be created, without seriously interfering with the total flow of fluid. The effort exerted upon the piston $e$ by the two different pressures which it sustains may be opposed or balanced by a spring $s$ or counterweight $w$, or both. The weighted piston rod $e^2$ is connected by a link 3 with one end of a lever 4, which lever at its opposite end is connected by a link 5 with a lever 6 which is pivoted at 7. The other end of the lever 6 is connected to the sliding collar of a centrifugal governor $g$. The throttle valve $d$ of the turbine $a$ is arranged to be operated by a lever 8 which is pivoted at 9, one end of said lever actuating the stem of the throttle valve, and the other end of said lever being connected by a link 10 with the lever 4 at a point intermediate its ends. The arrangement of levers is such that when the piston $e$ rises against the resistance of weight $w$, the lever 4 is raised (assuming the opposite end to be held stationary by the link 5) and acting through the link 10 pushes the lever 8 in a direction to close the throttle valve $d$ of the turbine engine. The governor $g$ acts in the usual manner through the lever 6, link 5, lever 4, link 10 and lever 8, to close the valve of the engine when the speed is too greatly increased, and to open the valve when the speed falls too low. For a given tension of the spring $s$, or a given value of the counterweight, the piston will be in equilibrium only if the fluid discharge maintains a corresponding constant value. If, for any cause the fluid discharge varies, the spring and counterweight will act to displace the piston and act upon the motor-controller (in this case the steam admission valve of the turbine) to change the speed of the motor sufficiently to bring the fluid discharge back to its normal value. Thus if the volume of fluid discharged through the pipe $f$ is too greatly increased, the pressure at the constricted portion of the inner one of the series of tubes is very greatly decreased, and the piston $e$ being subjected to this multiplied variation of pressure, rises against the resistance of weight $w$, and acts to close the throttle valve $d$ of the turbine engine, whereby the speed of the engine and the compressor is reduced until the discharge is brought back to its normal value. By varying the tension of the spring $s$ or the mass of the counterweight $w$, the apparatus may be caused to maintain any desired normal output. To obtain a perfect regulation of the output, the two extremities of the multiplier may be connected by a pipe $k$ forming a by-pass, that may be opened to a greater or less extent by means of a vane or valve, until the desired conditions of current flow are exactly fulfilled. The motor may also be furnished with an ordinary regulator such as the centrifugal governor $g$, connected by a system of levers to act in harmony with the fluid-pressure regulator.

Another application of my invention is illustrated in Fig. 2, which indicates an organization for regulating the outputs of two compressors so that the ratio of these outputs shall remain constant. For example, if the compressors act to receive and mingle two different gases, the composition of the mixture may be maintained constant. For this purpose, in the circuit of each fluid a multiplier may be arranged, connected to one of the ends of the regulator cylinder. In Fig. 2 one of the compressors $b$ takes in a gas and discharges it into the receiver $b^3$ of the second compressor $b^2$, which also receives another gas through an intake $o$. The two multipliers are placed in the intake pipes $m$ and $o$ for the two different gases. Variation of the output is obtained by opening or closing more or less a valve $v$ placed upon the intake pipe (or upon the discharge pipe) of one of the compressors. The regulating mechanism will then be acted upon by the differences in pressure set up by the two multipliers until these pressures and consequently the respective quantities of gas delivered will be maintained in the desired proportions.

I claim:

1. The combination with a fluid-impeller and a motor for driving the same, of a multiplier of pressure-difference arranged to be subjected to the varying fluid current driven by said impeller, a speed-regulator for said motor, and means for causing the operation of said speed-regulator to respond to the multiplied variations of pressure-difference produced by said multiplier of pressure-difference.

2. The combination with a fluid impeller and a motor for driving the same, of a regulator for said motor comprising a movable controlling part adapted to respond to changes in fluid-pressure to vary the speed of the motor, a series of converging-diverging tubes disposed in the fluid current driven by said impeller, said tubes being arranged concentrically one inside the other, the discharge mouth of each inner tube being located at the constricted portion of the tube next outside, and a pipe connecting the constricted portion of the innermost tube with the movable controlling part of the regulator, whereby said part is subjected to multiplied differences in pressure proportional to the current flow of the fluid, and the output from the impeller is thereby regulated.

3. The combination with a fluid-impeller and a motor for driving the same, of a regulator for said motor comprising a movable controlling part adapted to respond to changes in fluid-pressure to vary the speed of the motor, a multiplier of pressure-difference arranged to be acted upon by the fluid current driven by said impeller, a by-pass for the fluid around said multiplier, a valve controlling said by-pass, and means for continuously subjecting said movable controlling part of the motor-regulator to the multiplied varying pressure-difference, whereby the output from the impeller is regulated.

4. The combination with a fluid-impeller and a motor driving the same, of a centrifugal governor controlling the supply of energy to said motor, and a supplementary regulator combined therewith, having a movable controlling part adapted to respond to changes in fluid-pressure, a multiplier of pressure-difference arranged to be acted on by the varying fluid current driven by said impeller, and means for continuously subjecting said movable controlling part to such multiplied variations of pressure-difference; whereby the supply of energy to the motor is governed according to the output of the impeller, as well as according to the speed of said motor.

5. The combination with a conduit conveying fluid, of a multiplier of pressure difference composed of a series of converging-diverging tubes one inside the other in said conduit, mechanism subjected to the multiplied pressure difference existing at the constricted portion of the inner tube, and a by-pass around said multiplier.

6. The combination with a conduit conveying fluid, of mechanical means in said conduit for increasing the pressure-difference established by the flowing fluid, regulating mechanism continuously subjected to the multiplied pressure difference and a by-pass around that portion of the conduit containing said means.

7. The combination with a motor driven fluid impeller, of a regulator for said motor having a movable controlling part adapted to respond to changes in fluid pressure, means for transforming step by step a pressure difference created by the fluid current into a greatly increased pressure-difference, and means for continuously subjecting said movable controlling part to said proportionally increased variations of pressure-difference.

In witness whereof, I, hereunto subscribe my name this 4th day of January A. D., 1907.

AUGUSTE CAMILLE EDMOND RATEAU.

Witnesses:
FLUX SARTENSON,
HANSON C. COXE.